United States Patent Office 2,779,747
Patented Jan. 29, 1957

2,779,747

RUBBER SOFTENER COMPRISING REACTION PRODUCTS OF LIQUID COPOLYMERS OF CONJUGATED DIENES WITH COPOLYMERIZABLE HETEROCYCLIC NITROGEN BASES

James E. Pritchard, Bartlesville, Okla., assignor to Phillips Petroleum Company, a corporation of Delaware No Drawing. Application August 5, 1952,
Serial No. 302,833

8 Claims. (Cl. 260—45.5)

This invention relates to rubber softeners. In a further aspect this invention relates to rubber softeners or plasticizers which are non-extractable from rubber stocks in which they are employed and which undergo less swelling when in contact with hydrocarbon solvents than do conventional hydrocarbon softeners or plasticizers such as liquid polybutadiene. In a further aspect, this invention relates to rubber softeners prepared from liquid copolymers of conjugated dienes and copolymerizable heterocyclic nitrogen bases by quaternizing these liquid copolymers.

In the compounding of rubber stocks it is usual to add various amounts of rubber softeners or plasticizers in order to produce a more plastic rubber and a rubber in which the other ingredients are more easily incorporated. One difficulty with many of the commercial plasticizers is that they are extractable from the rubber stocks in which they are employed. Furthermore, they frequently have a tendency to swell when they are in contact with hydrocarbon solvents.

Each of the following objects it attained by at least one of the aspects of this invention.

An object of this invention is to provide a new class of rubber softeners. A further object of this invention is to provide rubber softeners which are entirely compatible with natural and synthetic rubber stocks and which are non-extractable therefrom. A further object of this invention is to provide rubber softeners comprising the reaction products of liquid copolymers of conjugated dienes and copolymerizable heterocyclic nitrogen bases and quaternizing agents. A further object of this invention is to provide a new method of plasticizing natural and synthetic rubber.

Other objects and advantages of this invention will be apparent to one skilled in the art upon reading this specification.

This invention relates to rubber softeners comprising the reaction products of quaternizing agents and liquid copolymers of conjugated diolefins with copolymerizable heterocyclic nitrogen bases. The liquid copolymers used are often syrupy liquids, but can range from very fluid to very viscous liquids, even having a viscosity as high as 10,000 Saybolt furol seconds at 100° F.

These compounds can be employed as softeners for both natural and synthetic rubber such as polymers and copolymers prepared from conjugated diolefins, haloprenes, aryl olefins, acrylic and substituted acrylic acids and their esters, nitriles, and amides, and alkyl vinyl ketones, esters, etc. They are particularly valuable as non-extractable softeners when employed in butadiene-acrylonitrile rubber, commonly known as Perbunan rubber. Preferred copolymerizable heterocyclic nitrogen bases are quinoline and pyridine derivatives containing at least one vinyl group.

In general heterocyclic nitrogen bases which are applicable in the practice of this invention are those which are copolymerizable with a conjugated diene and include the

substituted nitrogen bases wherein R is a hydrogen atom or a hydrocarbyl (containing only carbon and hydrogen atoms) group, such as an alkyl radical. The total number of carbon atoms in the alkyl groups attached to any pyridine or quinoline nucleus should not be greater than 12. In addition to the vinyl-substituted pyridines and vinyl-substituted quinolines the isopropenyl-substituted (i. e. vinyl group having a methyl substituent in the alpha position) pyridines and quinolines are useful.

Heterocyclic nitrogen bases which I have found to be particularly valuable are the mono- and divinyl pyridines, with the vinyl groups being present in any of the several positions in the pyridine nucleus. The alkyl groups are preferably methyl and ethyl groups although longer chain groups can be used, but in general the number of carbon atoms in said groups should not be greater than 12. These compounds have the structural formula

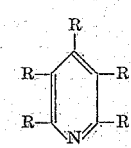

where R is selected from the group consisting of hydrogen, alkyl, vinyl, and alpha-methylvinyl groups; at least one and not more than two of said groups being vinyl or alpha-methylvinyl; and the total number of carbon atoms in the alkyl groups being not greater than 12. Examples of such compounds are 2-vinylpyridine; 2,5-divinylpyridine; 2-methyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5(α-methylvinyl)pyridine; 3,5-di(α-methylvinyl)pyridine; and the like.

The conjugated dienes employed in the practice of this invention for production of liquid copolymers are preferably those conjugated dienes which have from 4 to 6, inclusive, carbon atoms per molecule, and include 1,3-butadiene, isoprene, piperylene, methylpentadiene, 2,3-dimethyl-1,3-butadiene, chloroprene and others. However, conjugated dienes and conjugated diolefins having more than 6, such as 8, carbon atoms per molecule can also be used. Furthermore, various alkoxy, such as methoxy and ethoxy, and cyano derivatives of these conjugated diolefins can also be used in a practice of this invention.

When preparing the copolymers, the conjugated diene component generally makes up from 25 to 98 parts by weight and the copolymerizable heterocyclic nitrogen base makes up from 75 to 2 parts by weight of the monomeric material used. Mixtures of various conjugated dienes and mixtures of various copolymerizable heterocyclic nitrogen bases can be employed in the practice of this invention.

The corresponding quaternary compounds are obtained from copolymers of the conjugated diolefin and pyridine or quinoline derivatives containing at least one vinyl group, by interaction of the copolymers with a quaternizing agent. Among the quaternizing agents employed are the alkyl and alkylene halides such as methyl iodine, methyl bromide, ethyl iodide, propyl iodide, hexyl iodide, cetyl bromide, methylene iodide, ethylene bromide, and propylene chloride, various other substituted alkanes such as bromoform, chloropicrin, ethylene chlorohydrin, acetyl chloride, iodoform, and chloroacetyl chloride, alkyl sulfates such as methyl sulfate and ethyl sulfate, various substituted aromatic compounds such as picryl chloride, benzoyl chloride, benzene sulfonyl chloride, benzyl chloride, benzotrichloride, and methylbenzene sulfonate, and polyhalogenated cycloalkenes such as hexachlorocyclopentadiene. Quaternization of such copolymers is more fully described in copending Pritchard application, Serial No. 284,448, filed April 25, 1952.

The reaction between the liquid copolymers of the conjugated diene and the copolymerizable heterocyclic nitrogen base and the quaternizing agents hereinbefore described is generally affected at temperatures between zero and 250° C. The reaction time may be quite rapid, i. e. 5 to 10 minutes, but frequently a period of time running as high as 180 hours is required. The conditions of the reaction are determined, for the most part, by the materials being reacted.

The amount of quaternizing agent employed can be varied over a broad range depending upon the properties desired in the product. In many instances a stoichiometric equivalent of the quaternizing agent is employed while in other cases an excess is used. Much smaller quantities are, of course, applicable, and generally the amount of treating agent used is not more than 15 or 20 percent in excess of that stoichiometrically equivalent to the basic nitrogen atoms in the liquid copolymer. When an excess of a volatile treating agent is employed, the reaction mixture is generally heated under a vacuum at a temperature around 40 to 80° C. for a sufficient time to remove the unreacted treating agent.

The rubber softeners or plasticizers of this invention are non-extractable from the rubber stocks in which they are employed. These softeners have advantages over hydrocarbon softeners such as liquid polybutadiene in that the resultant compositions undergo less swelling when in contact with hydrocarbon solvents. In general, quaternization of the conjugated diolefin-heterocyclic nitrogen base copolymers gives materials which impart lower freezing points to the rubber stocks than the unquaternized material. These softeners are also superior to liquid polybutadiene for the same reasons.

These rubber softeners can be used alone or in mixtures with each other or in conjunction with other softeners. The amount of softener employed will vary depending upon the type of rubber stock being processed and the properties desired in a finished product. It will generally be in the range from 3 to 50 parts by weight per hundred parts of rubber, the greater amounts of softener being used when a harder rubber is being processed or when a soft product is desired.

In order that my invention may be fully understood, the following examples are given. These examples are given in an illustrative sense rather than by way of limitation.

*Example I*

Liquid copolymers of butadiene with 2-vinylpyridine and 2-methyl-5-vinyl-pyridine, using variable monomer ratios, were prepared by emulsion polymerization at 50° C. in accordance with the following recipe:

| | Parts by weight |
|---|---|
| Monomers | 100 |
| Water | 180 |
| Sodium fatty acid soap | 5 |
| Mercaptan blend [1] | 5 |
| $K_2S_2O_8$ | 0.3 |

[1] A blend of tertiary $C_{12}$, $C_{14}$, and $C_{16}$ aliphatic mercaptans in a ratio of 3 : 1 : 1 parts by weight.

The reactions were shortstopped with 0.1 part hydroquinone, and the polymers were stabilized with 2 percent phenyl-beta-naphthylamine and coagulated with acid and brine. Following coagulation the polymers were washed with dilute alkali to remove the soap and convert the pyridine nitrogen to the free base. The polymers were separated from the serum and wash water by decantation and dried 48 hours at 60° C. The liquid polymers thus prepared were reacted with benzyl chloride, or benzoyl chloride, using a 10 percent stoichiometric excess of the quaternizing agent. Reaction was effected at 60° C. for a time ranging from 120 to 160 hours. Each reaction mixture was then vacuum dried for 24 hours at 60° C. at a pressure of approximately 2 mm. Hg. The reaction time for the preparation of each sample is shown below.

| | Quaternizing Agent | Time, Hrs. |
|---|---|---|
| 50/50 Butadiene/2-vinylpyridine | Benzyl chloride | 160 |
| 75/25 Butadiene/2-vinylpyridine | do | 120 |
| 90/10 Butadiene/2-vinylpyridine | do | 140 |
| 98/2 Butadiene/2-vinylpyridine | do | 140 |
| 50/50 Butadiene/2-vinylpyridine | Benzoyl chloride | 120 |
| 75/25 Butadiene/2-methyl-5-vinylpyridine | Benzyl chloride | 120 |
| 90/10 Butadiene/2-methyl-5-vinylpyridine | do | 120 |
| 98/2 Butadiene/2-methyl-5-vinylpyridine | do | 120 |

The quaternized liquid polymers were evaluated as softeners in a 74/26 butadiene-acrylonitrile rubber using the following compounding recipes:

| | Parts by Weight | |
|---|---|---|
| | A | B |
| Butadiene-acrylonitrile rubber | 100 | 100 |
| Medium abrasion furnace black [1] | 60 | 60 |
| Zinc oxide | 5 | 5 |
| Stearic acid | 1.5 | 1.5 |
| Sulfur | 1.5 | 2.0 |
| Altax [2] | 1.5 | 1.75 |
| Softeners | 10 | 20 |

[1] Philblack A.
[2] Benzothiazyl disulfide.

The compounded stocks were cured 45 minutes at 307° F. and physical properties determined. Controls were run using the butadiene-acrylonitrile rubber compounded in accordance with the above recipes except that no softeners were used. Other controls using emulsion polymerized liquid polybutadiene and the commercial softener, TP-90B (high molecular weight polyether), were also run. The following results were obtained:

| Softener | | | | Sulfur, PHR[1] | Altax, PHR[1] | 212° F., Percent Comp. Set | Shore Hardness | Percent Swelled | Percent Extracted[2] | | Freeze Point, °C. | Compound MS 1 1/2 at 212° F. | Minutes to Incorporate Softener |
|---|---|---|---|---|---|---|---|---|---|---|---|---|---|
| Monomers | Monomer Ratio | Acid or Quat. Agent | PHR[1] | | | | | | Total | Net | | | |
| BD/2VP[3] | 50/50 | Benzyl chloride | 10 | 1.5 | 1.5 | 19.0 | 69 | 58.7 | 1.9 | 1.0 | −33 | 53.5 | 0.5 |
| BD/2VP | 50/50 | do | 20 | 2.0 | 1.75 | 25.0 | 70 | 45.2 | 2.9 | 2.0 | −32 | 42.5 | 0.5 |
| BD/2VP | 75/25 | do | 10 | 1.5 | 1.5 | 16.0 | 70 | 52.9 | 0.9 | 0.0 | −30 | 48.5 | 0.8 |
| BD/2VP | 75/25 | do | 20 | 2.0 | 1.75 | 18.1 | 69 | 60.4 | 1.6 | 0.7 | −31 | 35.5 | 1.0 |
| BD/2VP | 90/10 | do | 10 | 1.5 | 1.5 | 14.8 | 67 | 57.2 | 0.6 | 0.0 | −29 | 44.5 | 1.5 |
| BD/2VP | 90/10 | do | 20 | 2.0 | 1.75 | 15.1 | 64 | 68.4 | 0.8 | 0.0 | −29 | 28.5 | 1.5 |
| BD/2VP | 98/2 | do | 10 | 1.5 | 1.5 | 9.8 | 65 | 61.1 | 1.0 | 0.1 | −29 | 41.5 | 2.2 |
| BD/2VP | 98/2 | do | 20 | 2.0 | 1.75 | 12.1 | 64 | 71.4 | 0.8 | 0.0 | −28 | 29.0 | 2.0 |
| BD/2VP | 50/50 | Benzoyl chloride | 10 | 1.5 | 1.5 | 13.4 | 71 | 48.3 | 0.8 | 0.0 | −30 | 50.0 | 1.0 |
| BD/2VP | 50/50 | do | 20 | 2.0 | 1.75 | 22.7 | 74 | 47.3 | 1.2 | 0.4 | −30 | 38.5 | 1.5 |
| BD/2M5VP[4] | 75/25 | Benzyl chloride | 10 | 1.5 | 1.5 | 10.4 | 75 | 49.1 | 0.9 | 0.0 | −32 | 57.5 | 0.5 |
| BD/2M5VP | 75/25 | do | 20 | 2.0 | 1.75 | 11.8 | 79 | 48.7 | 1.3 | 0.4 | −34 | 47.0 | 0.8 |
| BD/2M5VP | 90/10 | do | 10 | 1.5 | 1.5 | 7.9 | 71 | 53.4 | 1.0 | 0.1 | −29 | 53.0 | 0.5 |
| BD/2M5VP | 90/10 | do | 20 | 2.0 | 1.75 | 10.2 | 71 | 61.3 | 1.0 | 0.1 | −30 | 39.0 | 0.8 |
| BD/2M5VP | 98/2 | do | 10 | 1.5 | 1.5 | 7.8 | 65 | 61.4 | 1.1 | 0.2 | −28 | 42.0 | 1.5 |
| BD/2M5VP | 98/2 | do | 20 | 2.0 | 1.75 | 8.4 | 64 | 70.6 | 1.5 | 0.6 | −28 | 29.5 | 2.2 |
| Liquid polybutadiene, emulsion polymerized | | | 10 | 1.5 | 1.5 | 7.7 | 63 | 64.1 | 0.9 | 0.0 | −27 | 42.5 | 1.5 |
| Do | | | 20 | 2.0 | 1.75 | 7.6 | 65 | 77.2 | 0.9 | 0.0 | −26 | 26.5 | 3.0 |
| Comercial softener—TP-90B | | | 10 | 1.5 | 1.5 | 7.2 | 65 | 34.1 | 5.9 | 5.0 | −37 | 36.5 | 2.5 |
| Do | | | 20 | 2.0 | 1.75 | 9.0 | 61 | 25.2 | 9.8 | 8.9 | −44 | 24.5 | 4.5 |
| None | | | | 1.5 | 1.5 | 6.5 | 70 | 55.0 | 0.9 | 0.0 | −27 | 60.0 | |
| Do | | | | 2.0 | 1.75 | 6.2 | 74 | 53.0 | 0.8 | 0.0 | −26 | 65.5 | |

[1] Parts per 100 parts rubber.
[2] Weight method. Weighed samples were immersed in a mixture containing 30 percent toluene and 70 percent isooctane at 158° F. for 48 hours, dried in an oven for three days at 158° F., and weighed again.
[3] Butadiene/2-vinylpyridine.
[4] Butadiene/2-methyl-5-vinylpyridine.

Example II

Liquid copolymers of butadiene with 2-methyl-5-vinylpyridine in a 75/25 monomer ratio were prepared by emulsion polymerization at 50° C. using the recipe given in Example I except that runs were made with both 5 and 20 parts mercaptan blend. The liquid polymers thus prepared were reacted with benzyl chloride, benzal chloride, hexachlorocyclopentadiene, and dinitrochlorobenzene. The reaction was effected at 93° C. for 46 hours. Each reaction mixture was then heated for 24 hours at 60° C. at a pressure of approximately 2 mm. Hg to remove the unreacted quaternizing agent.

The quaternized liquid polymers were evaluated as softeners in a 74/26 butadiene-acrylonitrile rubber using the compounding recipes given in Example I. The compounded stocks were cured 45 minutes at 307° F. and physical properties determined. Controls were run using emulsion polymerized liquid polybutadiene and the commercial softener, TP-90B. A control was also run in which no softener was added. The following results were obtained.

As many possible embodiments may be made of this invention without departing from the scope thereof, it is to be understood that all matter herein set forth is to be interpreted as illustrative and not in a limiting sense.

I claim:

1. As a new composition of matter, a rubber prepared by polymerizing butadiene and acrylonitrile and, per 100 parts by weight of said rubber, 3 to 50 parts of the addition product of (1) a quaternizing agent and (2) a liquid copolymer of a conjugated diene containing 4 to 8 carbon atoms and a copolymerizable heterocyclic nitrogen base selected from the group consisting of vinyl- and isopropenyl-substituted pyridines and vinyl- and isopropenyl-substituted quinolines, no more than two of said vinyl- and isopropenyl- groups being present on said pyridines and quinolines.

2. The composition of claim 1 in which said copolymer is prepared using monomer ratio of 25 to 98 parts by weight of said conjugated diene and 75 to 2 parts by weight of said copolymerizable heterocyclic nitrogen base.

3. The composition of claim 1 in which said copolymerizable heterocyclic nitrogen base is 2-methyl-5-vinylpyridine.

| Mercaptan, Parts | Quaternizing Agent | Softener PHR | Sulfur, PHR | Altax, PHR | 80° F. | | | 80° F., Oven Aged 24 Hours at 212° F. | | | Compound MS 1½ at 212° F. | Shore Hardness | Percent Swelled | Percent Extracted | | Freeze Point, °C. | 212° F., Percent Comp. Set | Min. to incorporate Softener |
|---|---|---|---|---|---|---|---|---|---|---|---|---|---|---|---|---|---|---|
| | | | | | 300% Modulus, p.s.i. | Tensile, p.s.i. | Percent Elongation | 300% Modulus, p.s.i. | Tensile, p.s.i. | Percent Elongation | | | | Total | Net | | | |
| 20 | Benzyl chloride | 10 | 1.5 | 1.5 | 1,640 | 1,830 | 320 | | 2,200 | 280 | 45 | 72 | 55.3 | 3.3 | 1.0 | −31 | 9.6 | 6 |
| 20 | do | 20 | 2.0 | 1.75 | 740 | 880 | 330 | 1,240 | 1,240 | 300 | 35 | 73 | 60.0 | 4.4 | 2.1 | −34 | 11.3 | 10 |
| 20 | Benzal chloride | 10 | 1.5 | 1.5 | 2,260 | 2,820 | 380 | 3,060 | 3,160 | 310 | 47 | 69 | 53.0 | 3.2 | 0.9 | −30 | 8.8 | 12 |
| 20 | do | 20 | 2.0 | 1.75 | 1,440 | 2,010 | 395 | 2,170 | 2,280 | 315 | 27 | 65 | 59.0 | 5.2 | 2.9 | −31 | 11.2 | 29 |
| 20 | Hexachlorocyclopentadiene | 10 | 1.5 | 1.5 | | 3,010 | 265 | | 2,900 | 205 | 49.5 | 76 | 47.0 | 3.0 | 0.7 | −29 | 6.4 | 2 |
| 20 | do | 20 | 2.0 | 1.75 | | 2,760 | 210 | | 2,780 | 170 | 44.0 | 79 | 44.7 | 3.5 | 0.8 | −26 | 7.6 | 2 |
| 20 | Dinitrochlorobenzene | 10 | 1.5 | 1.5 | 2,980 | 3,140 | 315 | | 3,210 | 265 | 44.0 | 74 | 49.8 | 3.3 | 1.0 | −29 | 8.4 | 11 |
| 20 | do | 20 | 2.0 | 1.75 | 2,670 | 2,870 | 315 | | 3,310 | 260 | 34.0 | 76 | 47.1 | 4.0 | 1.7 | −29 | 11.5 | 15 |
| 1 | | None | 1.5 | 1.5 | 3,360 | 3,390 | 305 | | 3,680 | 250 | 57.5 | 72 | 47.3 | 2.3 | 0.0 | −28 | 7.0 | |
| 5 | Benzyl chloride | 10 | 1.5 | 1.5 | | | | | | | 51.5 | 75 | 60.7 | 2.5 | 0.2 | −31 | 10.5 | 3 |
| 5 | do | 20 | 2.0 | 1.75 | | 880 | 210 | | 1,095 | 230 | 43.0 | 78 | 58.0 | 3.0 | 0.7 | −34 | 11.8 | 4 |
| Liquid polybutadiene, emulsion polymerized | | 10 | 1.5 | 1.5 | 2,190 | 2,340 | 315 | 2,980 | 3,110 | 310 | 39.5 | 66 | 68.5 | 2.9 | 0.6 | −29 | 9.6 | 12 |
| Do | | 20 | 2.0 | 1.75 | | 1,790 | 255 | | 2,590 | 265 | 25.5 | 64 | 77.8 | 4.8 | 2.5 | −29 | 9.1 | 16 |
| Commercial softener—TP-90B | | 10 | 1.5 | 1.5 | 2,930 | 3,190 | 315 | 3,360 | 260 | | 38.0 | 66 | 39.8 | 6.0 | 3.7 | −38 | 9.3 | 6 |
| Do | | 20 | 2.0 | 1.75 | | 2,700 | 290 | | 3,300 | 240 | 24.0 | 64 | 31.4 | 10.1 | 7.7 | −43 | 10.3 | 15 |

[1] Control in which no softener was added.

4. The composition of claim 1 in which said copolymerizable heterocyclic nitrogen base is 2-vinylpyridine.

5. The composition of claim 1 in which said quaternizing agent is benzyl chloride.

6. The composition of claim 1 in which said quaternizing agent is benzoyl chloride.

7. The composition of claim 1 in which said quaternizing agent is hexachlorocyclopentadiene.

8. The composition of claim 1 in which said quaternizing agent is dinitrochlorobenzene.

References Cited in the file of this patent

UNITED STATES PATENTS

| | | |
|---|---|---|
| 2,402,020 | Cislak et al. | June 11, 1946 |
| 2,460,038 | Serniuk | Jan. 25, 1949 |
| 2,469,132 | Schulze et al. | May 3, 1949 |
| 2,521,361 | Gessler | Sept. 5, 1950 |
| 2,543,844 | Fryling | Mar. 6, 1951 |
| 2,543,845 | Fryling | Mar. 6, 1951 |
| 2,543,867 | Pritchard | Mar. 6, 1951 |
| 2,619,445 | Kalafus | Nov. 25, 1952 |

OTHER REFERENCES

Fisher: India Rubber Journal, Jan. 27, 1940.